United States Patent [19]
Onaka et al.

[11] Patent Number: 5,894,362
[45] Date of Patent: Apr. 13, 1999

[54] OPTICAL COMMUNICATION SYSTEM WHICH DETERMINES THE SPECTRUM OF A WAVELENGTH DIVISION MULTIPLEXED SIGNAL AND PERFORMS VARIOUS PROCESSES IN ACCORDANCE WITH THE DETERMINED SPECTRUM

[75] Inventors: Hiroshi Onaka; Kazue Otsuka; Hideyuki Miyata, all of Kawasaki, Japan

[73] Assignee: Fujitsu Limited, Kawasaki, Japan

[21] Appl. No.: 08/699,563

[22] Filed: Aug. 19, 1996

[30] Foreign Application Priority Data

Aug. 23, 1995 [JP] Japan ................... 7-214733

[51] Int. Cl.$^6$ .............................. H04J 14/02
[52] U.S. Cl. .................. 359/124; 359/110; 359/161; 359/177
[58] Field of Search ...................... 359/110, 124, 359/127–130, 133–134, 161, 177

[56] References Cited

U.S. PATENT DOCUMENTS

| | | | |
|---|---|---|---|
| 5,563,731 | 10/1996 | Asahi | 359/177 |
| 5,617,234 | 4/1997 | Koga et al. | 359/130 |
| 5,654,816 | 8/1997 | Fishman | 359/177 |

OTHER PUBLICATIONS

Sato et al., "Network Performance and Integrity Enhancement with Optical Path Layer Technologies," *IEEE Journal on Selected Areas in Communications*, vol. 12, No. 1, Jan. 1994, pp. 159–170.

*Primary Examiner*—Kinfe-Michael Negash
*Attorney, Agent, or Firm*—Staas & Halsey

[57] ABSTRACT

An optical communication system for transmitting wavelength division multiplexed (WDM) signal light through an optical fiber. The optical communication system includes a decoupling unit and a monitoring unit. The decoupling unit decouples a portion of the WDM signal light from the optical fiber as a monitoring signal. The monitoring unit determines the spectrum of the WDM signal light from the monitoring signal and performs control processing in accordance with the determined spectrum. Control processing includes performing at least one of the following: (1) controlling light sources to maintain a constant wavelength of each light signal in the WDM signal light, (b) determining a noise figure of an optical amplifier which amplifies the WDM signal light, (c) controlling the optical amplifier to achieve a desired noise figure, (d) detecting a signal-to-noise ratio of the WDM signal light, (e) detecting a true signal power of the WDM signal light, (f) maintaining the true signal power to be at a constant level, (g) counting the number of channels in the WDM signal light, (h) equalizing the gain of an optical amplifier to maintain a flat gain, (i) selecting a light source from among redundant light sources for providing a light signal on a respective channel of the WDM signal light, or (j) selecting a respective channel of the WDM signal light for signal enhancement.

26 Claims, 11 Drawing Sheets

OPTICAL COMMUNICATION SYSTEM WHICH DETERMINES THE SPECTRUM OF A WAVELENGTH DIVISION MULTIPLEXED SIGNAL AND PERFORMS VARIOUS PROCESSES IN ACCORDANCE WITH THE DETERMINED SPECTRUM

CROSS REFERENCE TO RELATED APPLICATIONS

This application is based on, and claims priority to, Japanese patent application 7-214733, filed on Aug. 23, 1995, in Japan, and which is incorporated herein by reference.

BACKGROUND OF THE INVENTION

1. Field of the Invention

The present invention relates to an optical communication system using wavelength division multiplexed signal light to transmit a relatively large amount of data over an optical fiber. More particularly, the present invention relates to an optical communication system which determines the spectrum of wavelength division multiplexed signal light and controls an optical characteristic of the wavelength division multiplexed signal light or a parameter of the optical communication system in accordance with the spectrum.

2. Description of the Related Art

Multimedia networks continue to require larger capacity optical communication systems. Therefore, a significant amount of research is being performed in the area of wavelength-division multiplexing (WDM) to increase the capacity of optical communication systems.

FIG. 1 is a diagram illustrating a multiplexing portion of a conventional WDM optical communication system. Referring now to FIG. 1, a plurality of channels, $CH_1 \ldots CH_N$, are combined by an optical multiplexer 100 into a wavelength division multiplexed (WDM) signal light 102. An erbium doped fiber amplifier (EDFA) 104 has a wide gain band and is therefore used to amplify WDM signal light 102. An optical communication system as illustrated in FIG. 1 can be described, generally, as a transmission line medium network.

A path network, generally, is a network of various services and transmission line medium networks connected together. The individual transmission line medium networks are essentially "invisible" to individual users. Path networks typically perform functions such as multiplexing, cross-connect processing and branching/inserting. These functions usually require very high-speed signal processing. Unfortunately, a path network can easily reach an upper limit on allowable high-speed signal processing by the network. Wavelength division multiplexing may be useful to increase the high-speed signal processing of such path networks. Therefore, proposals have been set forth to increase signal processing in a path network by using wavelength division multiplexing. See, for example, K. Sato, et al, "Network Performance and . . ." IEEE, JACSC, vol. 12, No. 1, p. 159.

Moreover, an optical wave network using wavelength division multiplexing is proposed in H. Ishida, "A Transport Network with . . .", GLOBCOM'93). Such an optical wave network is expected to improve high-speed processing, flexibility, and simplification of a network.

To realize wavelength division multiplexing in future optical wave networks, it will likely be necessary to monitor various characteristics of the WDM signal light, and to perform various control based on the monitored characteristics. For example, it may be necessary to monitor (a) the number of transmission wavelengths in the WDM signal light, (b) the spacing between wavelengths of the WDM signal light, (c) an absolute value of optical power in each channel or variations in optical power between channels in the WDM signal light, (c) a signal-to-noise ratio (SNR) in each channel in the WDM signal light, (e) a modulation factor (modulation index) in each channel or a prechirp (phase modulation component additionally superimposed in modulating a signal) in each channel of the WDM signal light, and (f) a change in spectrum of the WDM signal light due to nonlinear effect of a transmission line.

A commercially available optical spectrum analyzer can be used to monitor characteristics of WDM signal light. For example, see M. Born and E. Wolf, "Principles of Optics", 4th ed., p. 412, and "Hewlett-Packard Lightwave Test and Measurement Catalog", 1994, p. 48. In a typical optical spectrum analyzer, light is dispersed by a diffraction grating, and a light component having a specific wavelength of the dispersed light is passed through a slit. The light component passing through the slit is received by a photodetector to measure the power of the light component. A different light component having a different wavelength is obtained by rotating the diffraction grating. Accordingly, rotation of the diffraction grating and measurement of optical power are synchronously performed to allow measurement of a wavelength distribution (optical spectrum) of optical power.

However, this type of optical spectrum analyzer has a mechanical movable part for rotating or moving the diffraction grating. As a result, this type of optical spectrum analyzer lacks long-term stability and reliability. Further, this type of optical spectrum analyzer requires a time period of approximately one second for measurement of an optical spectrum, and therefore cannot provide fast enough response for many types of monitoring and control functions. Therefore, this type of optical spectrum analyzer will not allow for appropriate characteristics of WDM signal light to be monitored and controlled.

A scanning Fabry-Perot interferometer can also be used to monitor WDM signal light. See, for example, A. Yariv, "Optical Electronics", 3rd Edition, p. 92–95. However, the interferometer has a reflecting mirror which must be moved to monitor WDM signal light. As a result, the interferometer lacks long-term stability and reliability. In addition, such a device will not provide a fast enough response to allow WDM signal light providing a high-speed data transmission to be appropriately monitored and controlled.

In view of the above, conventional devices are available to determine the spectrum of an optical signal. However, these devices will not allow various characteristics of a WDM signal light or parameters of the communication system to be controlled in accordance with the spectrum.

SUMMARY OF THE INVENTION

Accordingly, it is an object of the present invention to provide an optical spectrum analyzer which does not require moving parts and can therefore provide a fast, reliable response for use in an optical communication system employing wavelength division multiplexing.

It is an additional object of the present invention to provide an optical communication system employing wavelength division multiplexing and which can monitor or adjust various characteristics of a WDM signal light, based on the spectrum of the WDM signal light.

Moreover, it is an object of the present invention to provide an optical communication system which ensures long-term stability, improvement in reliability, and high-speed response in performing monitor/control of WDM signal light.

Additional objects and advantages of the invention will be set forth in part in the description which follows, and, in part, will be obvious from the description, or may be learned by practice of the invention.

The foregoing objects of the present invention are achieved by providing an optical communication system for transmitting WDM signal light through an optical fiber. The optical communication system includes a decoupling unit and a monitoring unit. The decoupling unit decouples a portion of the WDM signal light from the optical fiber as a monitoring signal. The monitoring unit determines the spectrum of the WDM signal light from the monitoring signal and performs control processing in accordance with the determined spectrum.

Control processing performed by the monitoring unit includes at least one of the following: (1) controlling light sources to maintain a constant wavelength of each light signal in the WDM signal light, (b) determining a noise figure of an optical amplifier which amplifies the WDM signal light, (c) controlling the optical amplifier to achieve a desired noise figure, (d) detecting a signal-to-noise ratio of the WDM signal light, (e) detecting a true signal power of the WDM signal light, (f) maintaining the true signal power to be at a constant level, (g) counting the number of channels in the WDM signal light, (h) equalizing the gain of an optical amplifier to maintain a flat gain, (i) selecting a light source from among redundant light sources for providing a light signal on a respective channel of the WDM signal light, or (j) selecting a respective channel of the WDM signal light for signal enhancement. In addition, control processing includes controlling any other characteristic of the WDM signal light in accordance with the determined spectrum.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
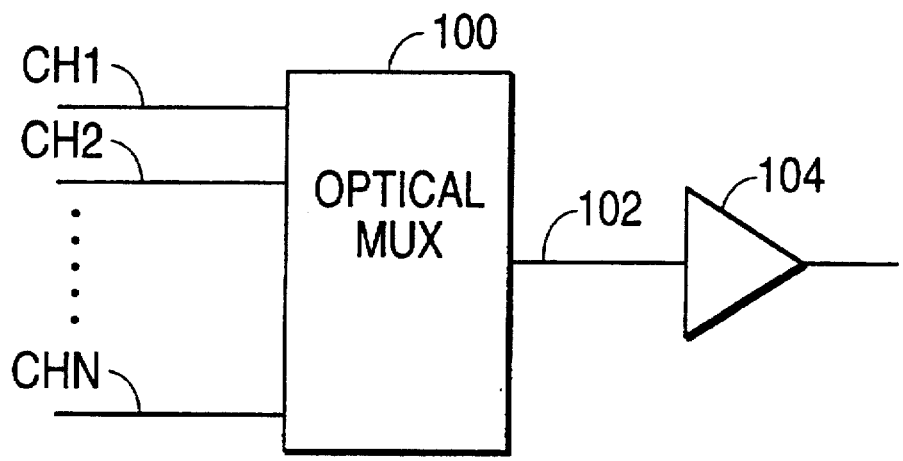
FIG. 1 (prior art) is a diagram illustrating a multiplexing portion of a conventional WDM optical communication system.

Reference will now be made in detail to the present preferred embodiment of the present invention, examples of which are illustrated in the accompanying drawings, wherein like reference numerals refer to like elements throughout.

Figure 2:
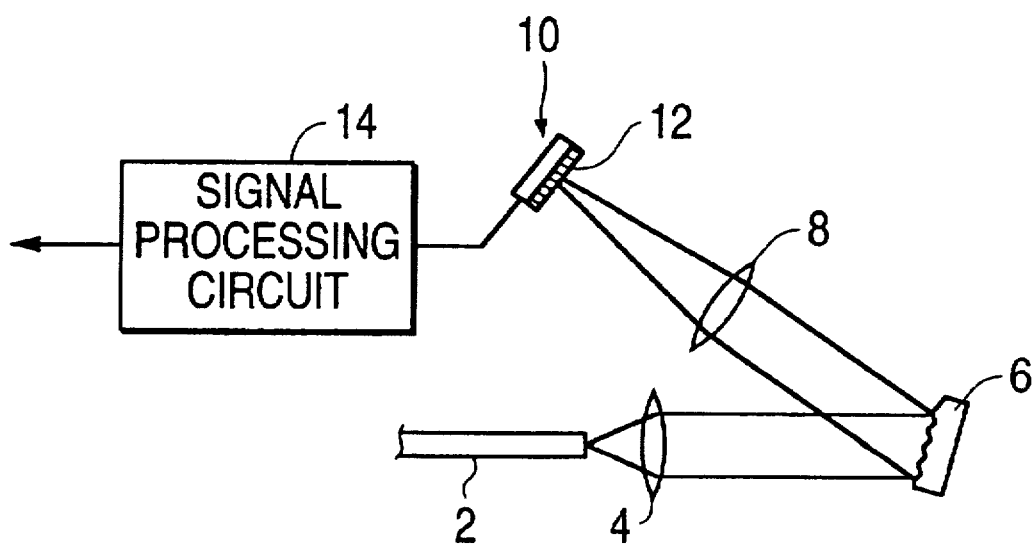
FIG. 2 is a diagram illustrating an optical spectrum monitor, according to an embodiment of the present invention.

FIG. 2 is a diagram illustrating an optical spectrum monitor, according to an embodiment of the present invention. Referring now to FIG. 2, a monitoring signal is introduced into an optical fiber 2. The monitoring signal is a portion of signal light extracted as the signal light travels along a main optical path (not illustrated) in an optical wave network (not illustrated) or other such optical communication system (not illustrated). The monitoring signal is emitted from an excitation end of optical fiber 2, and is collimated by a lens 4 to be received by a reflection type diffraction grating (spectroscope) 6. The monitoring signal is then reflected by diffraction grating 6, and converged by a lens 8 to enter a photodetector array 10.

The grating constant and location of diffraction grating 6 are set so that diffraction grating 6 can disperse the monitoring signal in a band containing the wavelength of at least the signal light. Photodetector array 10 has a plurality of opto-electric conversion elements 12 positioned to receive the dispersed light from diffraction grating 6. The direction of propagation of light dispersed from diffraction grating 6 changes in a plane parallel to the sheet plane of FIG. 2, with, for example, wavelength. In this case, opto-electric conversion elements 12 are positioned to be parallel to the sheet plane of FIG. 2, thereby allowing collective measurement of optical power of various wavelengths by the use of photodetector array 10. Photodetector array 10 can be considered to be an optical receiver and can be, for example, a PIN-photodiode array or a charged coupled device (CCD) sensor employing a material having a sensitivity at 1.3 to 1.5 µm bands typically used in optical communication.

Therefore, diffraction grating 6 can be described as a dispersion unit which simultaneously disperses different wavelength components of the monitoring signal in different directions. Moreover, photodetector array 10 can be described as including opto-electric conversion elements at fixed positions for receiving the wavelength components dispersed from the dispersion unit without rotating or moving the dispersion unit. Therefore, neither diffraction grating 6 or photodetector array 10 needs to be moved or rotated to detect different wavelength components of signal light.

An output signal from the photodetector array 10 is supplied to a signal processing circuit 14. Signal processing circuit 14 is an electronic circuit for reading light power signals of various wavelengths detected by opto-electric conversion elements 12 and performing signal processing to determine the optical spectrum of signal light.

Figure 3:
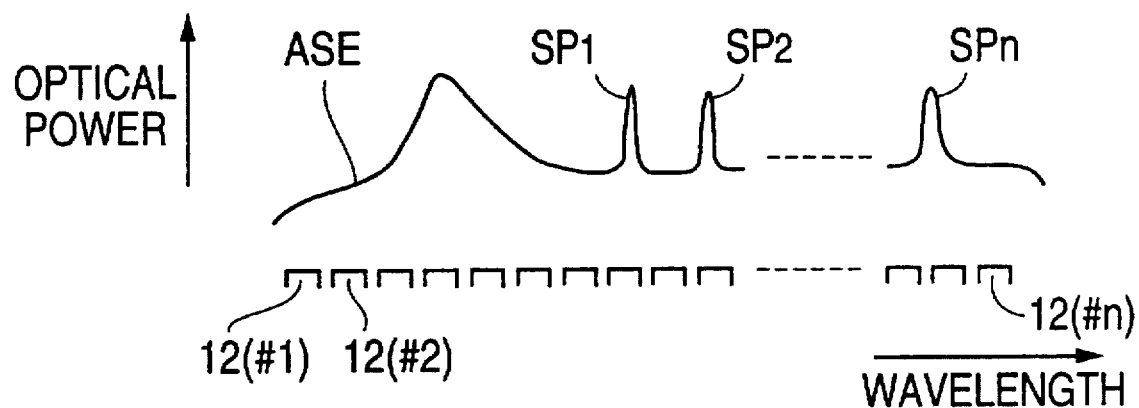
FIG. 3 is a diagram illustrating a spectrum obtained by an optical spectrum monitor as illustrated in FIG. 2.

FIG. 3 is a diagram illustrating a spectrum obtained by an optical spectrum monitor as illustrated in FIG. 2. Referring now to FIG. 3, the vertical axis represents optical power and the horizontal axis represents wavelength. In the spectrum illustrated in FIG. 3, spectrum peaks SP1 to SPn in channels of WDM signal light are superimposed on a noise component of amplified spontaneous emission (ASE). Microscopic bands 12(#1) . . . 12(#n) represent microscopic bands that can be detected by opto-electric conversion elements 12. The band of a typical EDFA is in the range of about 1535 to about 1560 nm, and in this case the bandwidth is about 25 nm. Accordingly, for example, by using photodetector array 10 comprising five-hundred-and-twelve (512) opto-electric conversion elements 12, and suitably designing an optical communication system for spectrometry, an optical spectrum can be measured with a resolution of 0.05 nm or less in principle. Furthermore, the optical spectrum monitor shown in FIG. 2 has no mechanical movable parts, so that electric signals for determining the spectrum can be processed at high speeds on the order of milliseconds to microseconds.

Figure 4:
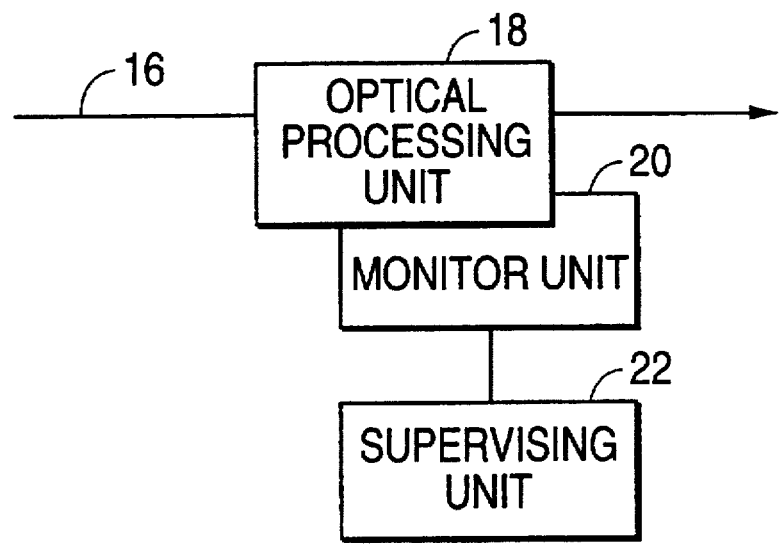
FIG. 4 is a diagram illustrating an optical communication system according to an embodiment of the present invention.

FIG. 4 is a diagram illustrating an optical communication system according to an embodiment of the present invention. Referring now to FIG. 4, signal light is transmitted through a main optical path 16. Main optical path 16 can be, for example, a fixed line or signal light paths in an optical wave network. An optical processing unit 18 performs various processes on the signal light. The various processes performed by optical processing unit 18 includes at least one of the following processes: transmitting (sending), receiving, repeating, branching (inclusive of insertion of signal light at optical nodes), and switching. A monitor unit 20 receives a portion of the signal light and detects the spectrum of signal light, depending on the processes performed by optical processing unit 18. Various characteristics of the signal light can then be monitored or controlled by analyzing the detected spectrum. Monitor unit 20 can include, for example, an optical coupler (not illustrated) for extracting a monitoring signal from main optical path 16. The extracted monitoring signal is a portion of the signal light travelling through main optical path 16. Monitoring unit 20 can also include an optical spectrum monitor (not illustrated), such as the optical spectrum monitor illustrated in FIG. 2.

Preferably, the optical communication system also includes a supervising unit 22, for monitoring and/or adjusting characteristics of the signal light in accordance with the monitored optical spectrum. For example, the wavelength, power and/or SNR of signal light can be adjusted or calculated by supervising unit 22, according to the spectrum of the signal light detected by monitor unit 20.

In the case that the signal light is WDM signal light comprising a plurality of channels of signal light, it is preferable that characteristics monitored by the monitoring unit 20 include the number of channels of the WDM signal light.

A controller (not illustrated) can be provided for controlling the monitored characteristics. If such a controller is provided, the controller is not required to be located near monitor unit 20. Accordingly, to allow remote control of the monitored characteristics, it is preferable that the optical communication system further include a mechanism for transferring information relating to the monitored characteristic to the controller.

Therefore, according to embodiment of the present invention, an optical communication system transmits a wavelength division multiplexed (WDM) signal light through an optical fiber. A decoupling unit decouples a portion of the WDM signal light from the optical fiber as a monitoring signal. A monitoring unit (such as the combination of monitor unit 20 and supervising unit 22 in FIG. 4) determines the spectrum of the WDM signal light from the monitoring signal and performs control processing in accordance with the determined spectrum.

As will be seen from the various embodiments of the present invention disclosed below, control processing includes performing at least one of the following: (1) controlling light sources to maintain a constant wavelength of each light signal in the WDM signal light, (b) determining a noise figure of an optical amplifier which amplifies the WDM signal light, (c) controlling the optical amplifier to achieve a desired noise figure, (d) detecting a signal-to-noise ratio of the WDM signal light, (e) detecting a true signal power of the WDM signal light, (f) maintaining the true signal power to be at a constant level, (g) counting the number of channels in the WDM signal light, (h) equalizing the gain of an optical amplifier to maintain a flat gain, (i) selecting a light source from among redundant light sources for providing a light signal on a respective channel of the WDM signal light, or (j) selecting a respective channel of the WDM signal light for signal enhancement. In addition, control processing includes controlling any other characteristic of the WDM signal light in accordance with the determined spectrum.

Figure 5:
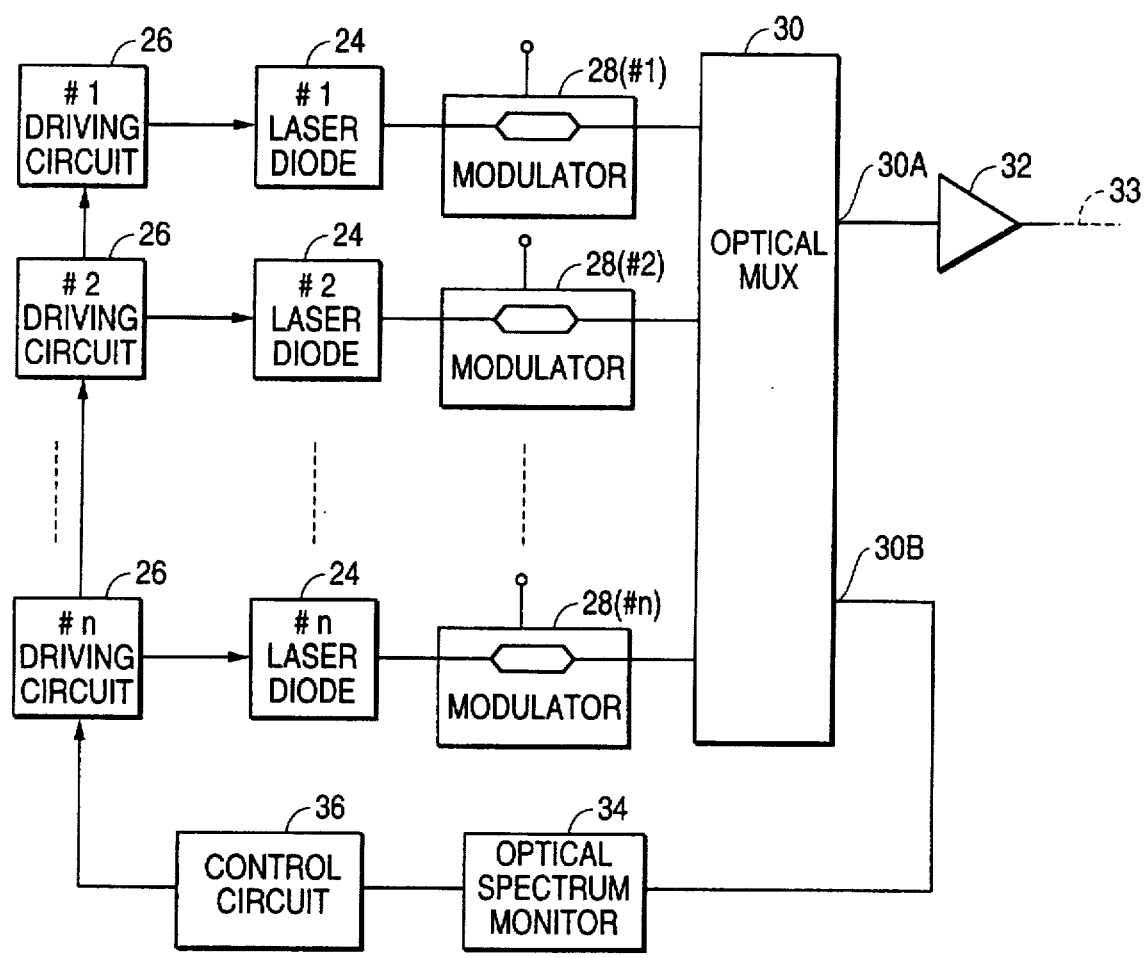
FIG. 5 is a diagram illustrating an optical communication system according to an embodiment of the present invention.

FIG. 5 is a diagram illustrating an optical communication system according to an embodiment of the present invention. Referring now to FIG. 5, a plurality of laser diodes 24 (#1 to #n) whose number corresponds to the number of channels of WDM signal light are provided as light sources. Laser diodes 24 (#1 to #n) are driven by driving circuits 26 (#1 to #n), respectively. Laser diodes 24 (#1 to #n) output light signals having wavelengths λ1 to λn, respectively. The light signals having wavelengths λ1 to λn are subjected to modulation with transmission data by high-speed, external modulators 28 (#1 to #n), respectively. Thereafter, the modulated light signals are joined together by an optical multiplexer 30, to thereby form WDM signal light.

Optical multiplexer 30 has an output port 30A and an output port 30B. A large part of the WDM signal light is supplied from output port 30A to an optical amplifier 32. Optical amplifier 32 amplifies the received portion of the WDM signal light, and feeds the amplified portion of the WDM signal light to a main optical path 33. Optical amplifier 32 can be, for example, a conventional optical amplifier or can be an amplifier as disclosed in U.S. patent application titled MULTI-WAVELENGTH LIGHT AMPLIFIER, Ser. No. 08/655,027, filed May 28, 1996, which is incorporated herein by reference.

Moreover, a portion of the WDM signal light is output from output port 30B of optical multiplexer 30, and is a "monitoring signal" which is supplied to an optical spectrum monitor 34. Optical spectrum monitor detects the spectrum of the WDM signal light from the monitoring signal. Optical spectrum monitor 34 is configured as illustrated, for example, in FIG. 2.

The spectrum detected by optical spectrum monitor 34, or other characteristic information of the monitoring signal, is supplied to a control circuit 36. Control circuit 36 detects the wavelength of the signal light in each channel of the WDM signal light according to the spectrum detected by optical spectrum monitor 34, and controls laser diodes 24 (#1 to #n) so that each detected wavelength becomes constant. More specifically, control circuit 36 controls bias currents to be supplied from driving circuits 26 (#1 to #n) to laser diodes 24 (#1 to #n), and thereby stabilizes the oscillation wavelength of each laser diode.

The control subject for stabilization of the oscillation wavelength may be the temperature of each laser diode. In stabilizing the wavelength by the use of optical spectrum monitor 34, the reference of the wavelength is decided by a diffraction grating (for example, such as diffraction grating 6 illustrated in FIG. 2) incorporated in optical spectrum monitor 34. Of course, optical power fluctuations, SNR, or other factors, rather than or in addition to the wavelength fluctuations in the light sources, may be monitored and controlled. Alternatively, the number of channels in WDM signal light may be monitored and an alarm can be issued in case of abnormality.

Therefore, as illustrated in FIG. 5, a monitoring unit includes optical spectrum monitor 34 and control circuit 36. The monitoring unit performs control processing. The control processing illustrated in FIG. 5 includes detecting the respective wavelength of the signal light in each channel of the WDM signal light from the spectrum of the WDM signal light, and controlling the light sources (that is, laser diodes 24) to maintain the detected wavelength of each light signal to be constant.

Figure 6:
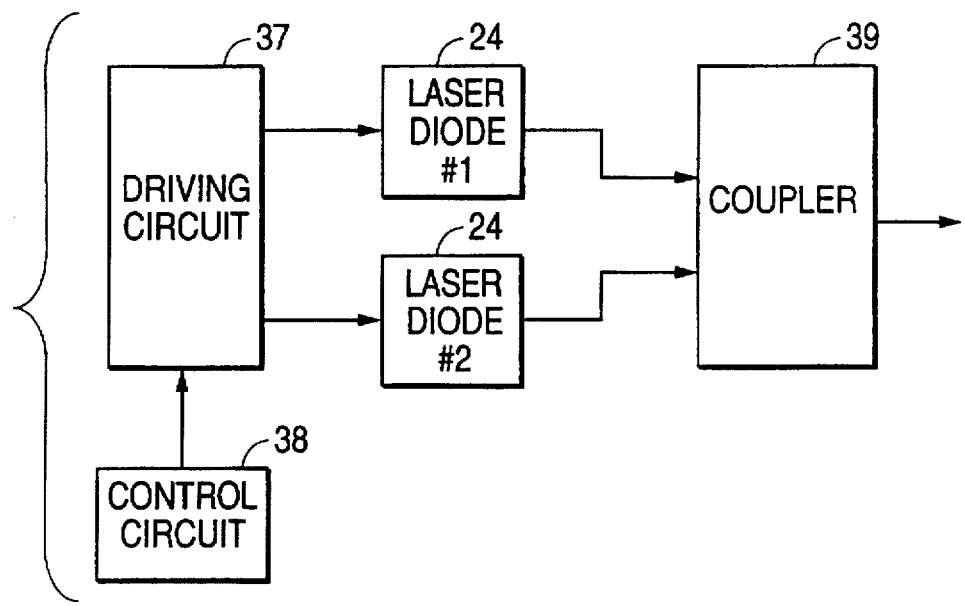
FIG. 6 is a diagram illustrating a modification to the optical communication system illustrated in FIG. 5, to provide redundant light sources, according to an embodiment of the present invention.

FIG. 6 is a diagram illustrating a modification to the optical communication system illustrated in FIG. 5, to provide redundant light sources, according to an embodiment of the present invention. More specifically, as illustrated in FIG. 6, redundant laser diodes 24 can be provided for each channel. In this case, a driving circuit 37 drives two laser diodes, laser diode 24(#1) and laser diode 24 (#2). Driving circuit 37 is controlled by control circuit 38. The outputs of laser diodes 24 (#1 and #2) are coupled together by a coupler 39 to provide a light source for one channel. In this manner, each channel can be provided with redundant light sources. Moreover, each channel is not limited to having two redundant light sources, and a plurality of light sources can be provided for each channel to provide additional redundancy.

Figure 7:
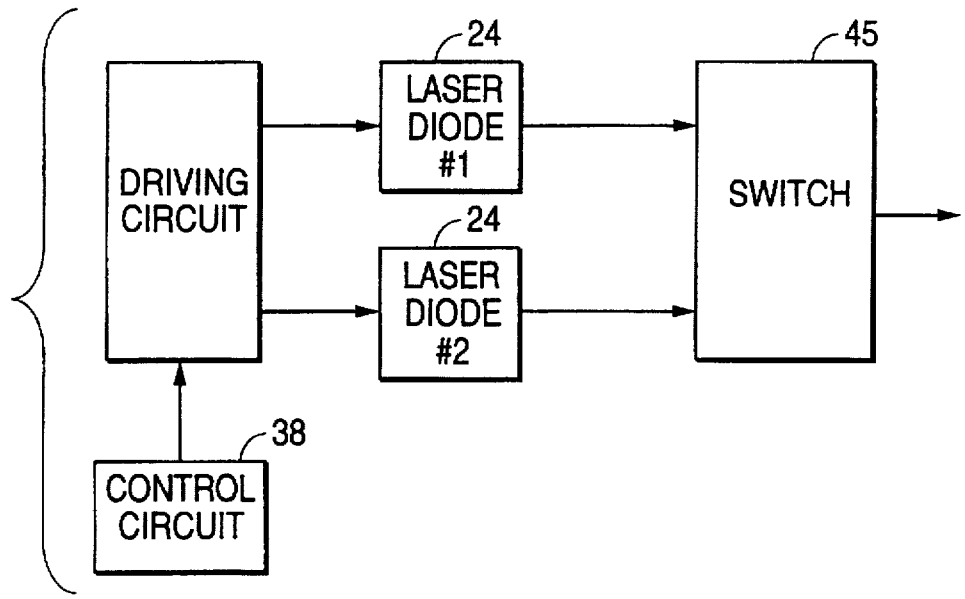
FIG. 7 is a diagram illustrating an additional modification to the optical communication system illustrated in FIG. 5, to provide redundant light sources, according to an embodiment of the present invention.

FIG. 7 is a diagram illustrating an additional modification to the optical communication system illustrated in FIG. 5, to provide redundant light sources, according to an embodiment of the present invention. The embodiment of the present invention illustrated in FIG. 7 is similar to the embodiment of the present invention illustrated in FIG. 6, except that coupler 39 is replaced with a switch 45 to select either the output of laser diode 24(#1) or the output of laser diode 24 (#2). Preferably, switch 45 is controlled by control circuit 38.

Redundant light sources in each channel, as illustrated in FIGS. 6 and 7, can be either "hot" standby light sources or "cold" standby light source. A "hot" standby light source indicates that one of the light sources is a main light source, and the other light source is a redundant light source which is operational even when it is not being used to supply light to the channel. For example, in FIGS. 6 and 7, laser diode 24(#1) can be the main light source, and laser diode 24(#2) can be a hot standby light source which is only used to supply light to the channel when the main light source is not operating properly. "Cold" standby light sources indicate that one of the light sources is a main light source, and the other light source is a redundant light source which is only operational when it is required to supply light to the channel. Thus, the redundant light source is generally not operating when the main light source is operating satisfactorily. For example, in FIGS. 6 and 7, laser diode 24(#1) can be the main light source, and laser diode 24(#2) can be a cold standby light source which is not operating when the main light source is operating properly. The cold standby light source is only turned ON and placed on-line when the main light source is not operating properly.

Therefore, as illustrated in FIGS. 5-7, a monitoring unit includes optical spectrum monitor 34 and control circuit 36. The monitoring unit determines the spectrum of WDM signal light and performs control processing in accordance with the determined spectrum. As illustrated in FIG. 5-7, control processing includes selecting a light source from redundant light sources to provide a light signal on a respective channel of WDM signal light. The selection is made in accordance with the determined spectrum.

Figure 8:
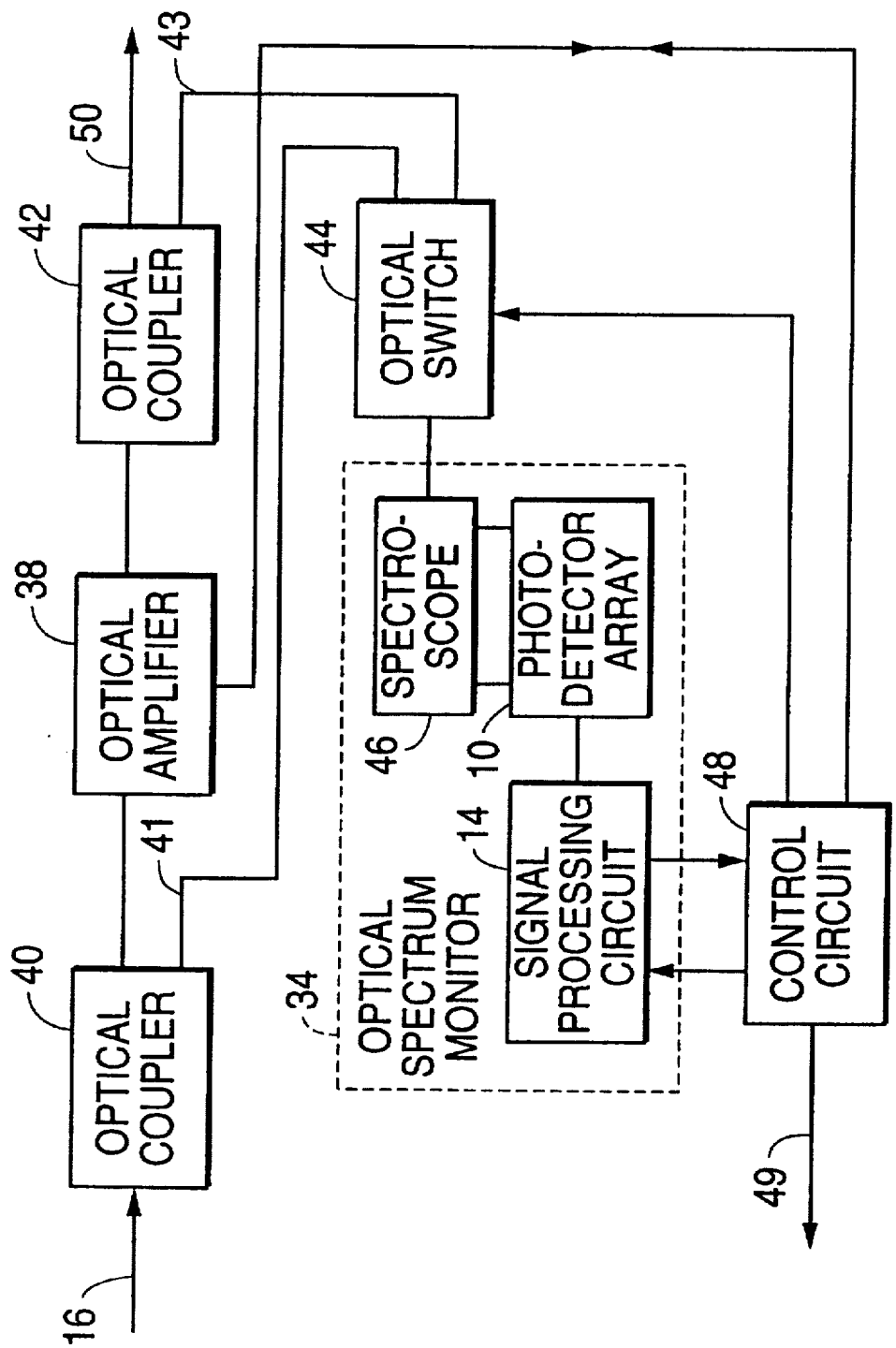
FIG. 8 is a diagram illustrating an optical repeating system according to a further embodiment of the present invention.

FIG. 8 is a diagram illustrating an optical repeating system according to a further embodiment of the present invention. Referring now to FIG. 8, an optical amplifier 38 collectively amplifies WDM signal light transmitted through main optical path 16 and outputs the amplified signal light. An EDFA may be used as optical amplifier 38. A typical EDFA includes an erbium doped fiber (EDF) (not illustrated) to which WDM signal light is supplied, a pumping light source (not illustrated) for generating pumping light, and an optical coupler (not illustrated) for introducing the WDM signal light and the pumping light to the EDF. Instead of an EDFA, optical amplifier 38 can be, for example, a semiconductor amplifier employing an optical semiconductor diode as an amplifying medium. Alternatively, optical amplifier 38 can be an amplifier utilizing a nonlinear effect in an optical fiber, such as Raman effect. In the following description, the optical amplifier 38 is regarded as the EDFA for convenience of illustration.

Optical couplers 40 and 42 are provided upstream and downstream, respectively, of optical amplifier 38 in main optical path 16. Optical coupler 40 branches off a first monitoring signal 41, and optical coupler 42 branches off a second monitoring signal 43. First monitoring signal 41 and second monitoring signal 43 are selectively supplied through an optical switch 44 to an optical spectrum monitor 34. An output 50 of optical coupler 42 is transmitted as the WDM signal light.

Optical spectrum monitor 34 includes a spectroscope 46, which corresponds to lenses 4 and 8 and diffraction grating 6 illustrated in FIG. 2. An output signal from a signal processing circuit 14 provided in optical spectrum monitor 34 is supplied to a control circuit 48. Control circuit 48 controls the power of pumping light in optical amplifier 38 and controls switching of optical switch 44. For example, the number of channels of WDM signal light and the input level and SNR on each channel upstream of optical amplifier 38 can be detected by measuring the spectrum obtained from first monitoring signal 41.

Moreover, the number of channels of WDM signal light can be detected in accordance with a first mode or a second mode. In the first mode for detecting the number of channels of WDM signal light, control circuit 48 illustrated in FIG. 8 or supervising unit 22 illustrated in FIG. 4 counts the number of narrow bands where the level corresponding to the signal light on each channel in the spectrum obtained is greater than a predetermined threshold.

Figure 9:
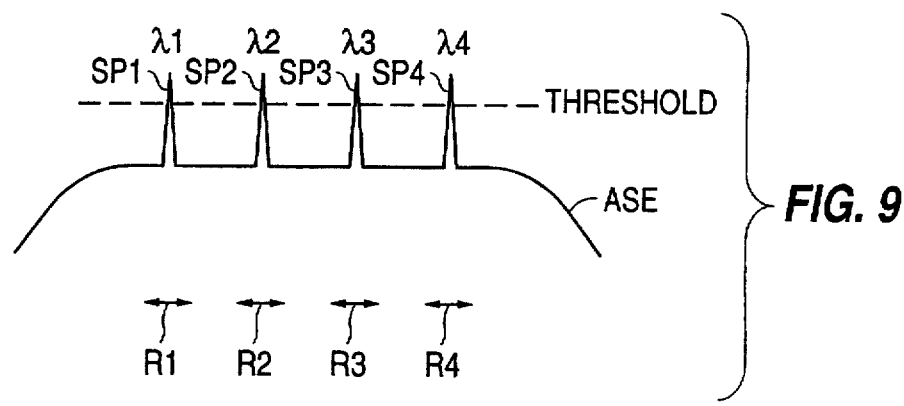
FIG. 9 is a diagram illustrating a first mode for detecting the number of channels in WDM signal light, according to an embodiment of the present invention.

FIG. 9 is a diagram illustrating the first mode for detecting the number of channels in WDM signal light, according to an embodiment of the present invention. Referring now to FIG. 9, it is assumed that four spectrum peaks SP1 to SP4 corresponding to four channels are superimposed on an amplified spontaneous emission (ASE) noise component in the obtained spectrum. In this case, narrow wavelength bands R1 to R4 where the light signals on the four channels are present are preliminarily stored in control circuit 48 (see FIG. 8), for example, and the absolute value of a signal level in each wavelength band or the proportion of the signal level to the total power is detected, thereby detecting whether or not the light signal on each channel is present in the corresponding wavelength band.

Therefore, as illustrated in FIG. 8, a monitoring unit includes optical spectrum monitor 34 and control circuit 48. The monitoring unit determines the spectrum of WDM signal light and performs control processing in accordance with the determined spectrum. As illustrated in FIGS. 8 and 9, control processing performed by the monitoring unit includes counting the number of channels of the WDM signal light from the determined spectrum. As illustrated in FIG. 9, the determined spectrum indicates the power level of the WDM signal light in a plurality of bands. In the first mode, the monitoring unit determines the number of channels by counting the number of bands in which the power level of the WDM signal light is greater than a threshold level.

In the first mode, however, it is necessary to preliminarily allocate wavelengths for carrying the light signals in a communication system, and to preliminarily store the narrow bands where the light signals are present. Further, it may be difficult to identify a signal when the distribution of ASE noise generated in the optical amplifier is not uniform.

In the second mode for detecting the number of channels of WDM signal light, control circuit 48 or supervising means 22 calculates a differential signal of the obtained spectrum, and counts the number of narrow bands where the signal level corresponding to the signal light on each channel in this differential signal is greater than a predetermined threshold.

Figure 10:
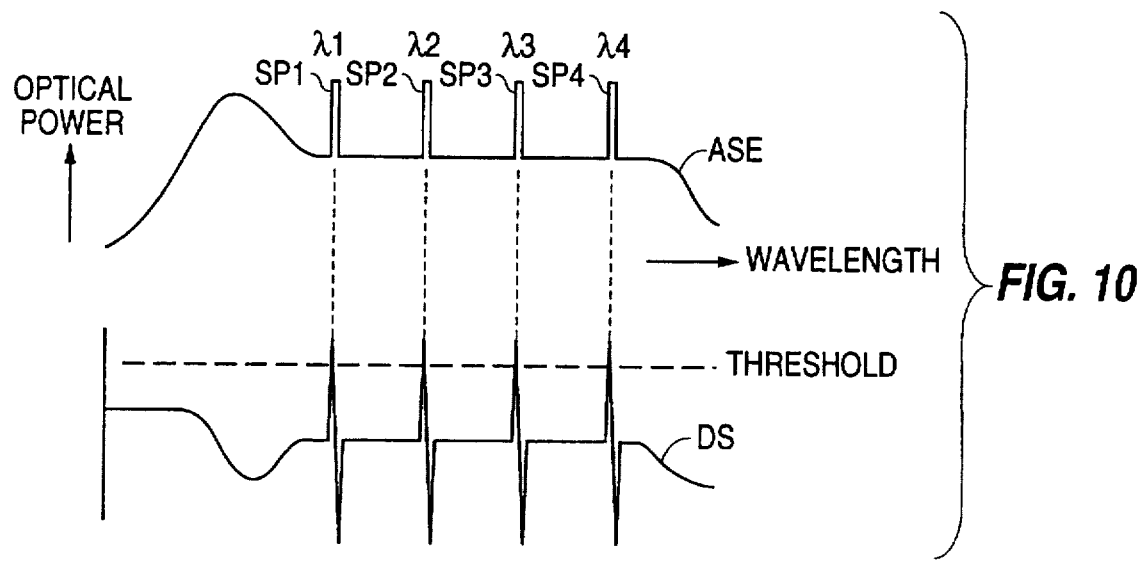
FIG. 10 is a diagram illustrating a second mode for detecting the number of channels in WDM signal light, according to an embodiment of the present invention.

FIG. 10 is a diagram illustrating the second mode for detecting the number of channels in WDM signal light, according to an embodiment of the present invention. Referring now to FIG. 10, the wavelength characteristic of a noise component generated in the optical amplifier shows a moderate change, whereas a signal component has steep spectrum peaks. Accordingly, a differential curve DS of the obtained spectrum is provided. When a differential value on the differential curve DS is greater than a predetermined threshold, the presence of any channel corresponding to the differential value can be determined. According to the second mode, even when the power of the noise component is almost the same as the power of the signal component, the number of channels can be reliably detected.

Therefore, in the second mode illustrated in FIG. 10, a monitoring unit determines the number of channels in WDM signal light by forming a differential signal of the spectrum of the WDM signal light. The differential signal corresponds to changes in the power level of the WDM signal light in a plurality of bands. The monitoring unit counts the number of bands in which the differential signal is greater than a threshold level.

Figure 11:
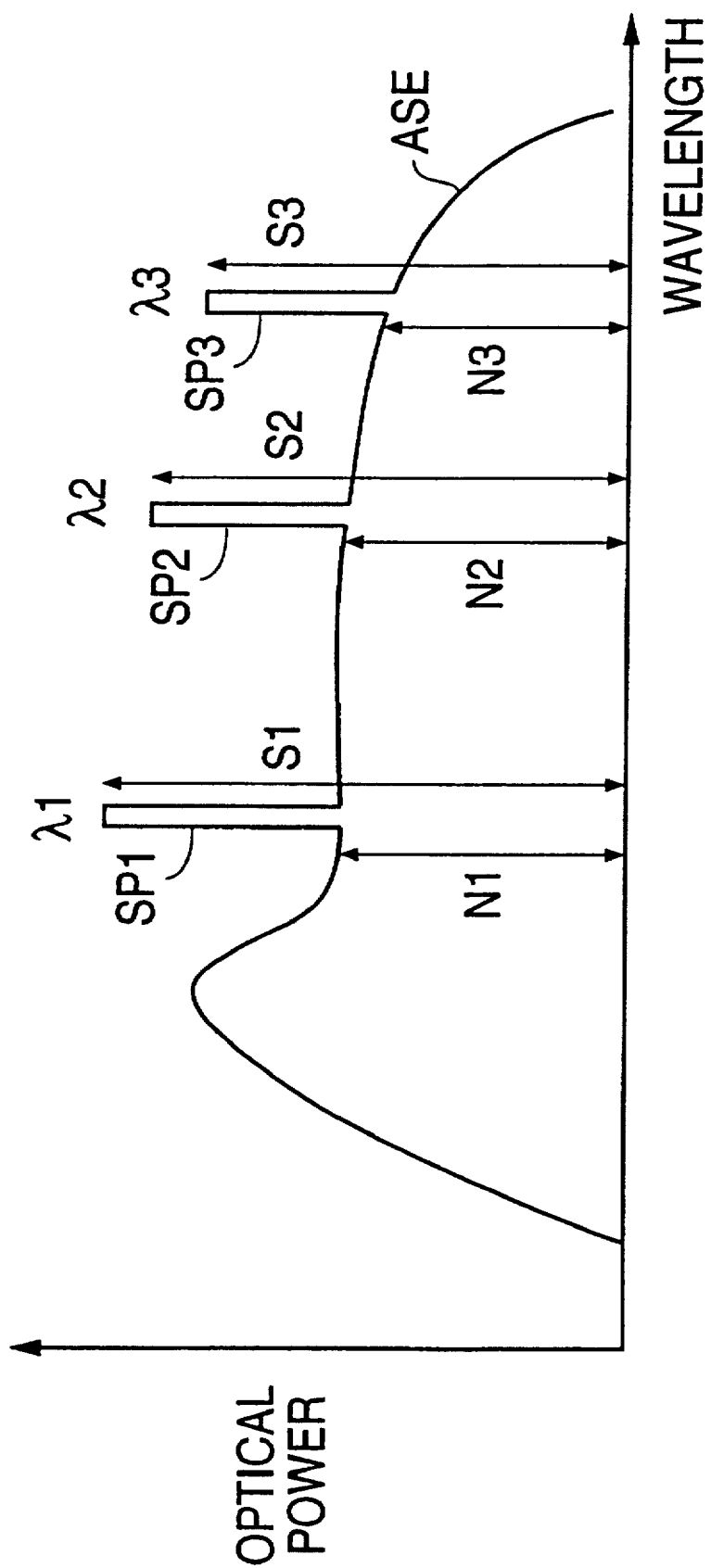
FIG. 11 is a graph illustrating signal-to-noise ratio (SNR) detection, according to an embodiment of the present invention.

FIG. 11 is a graph illustrating signal-to-noise ratio (SNR) detection in each channel of WDM signal light, according to an embodiment of the present invention. More specifically, FIG. 11 illustrates, for example, a spectrum obtained by optical spectrum monitor 34 of FIG. 8. Referring now to FIG. 11, the spectrum includes a signal component in each channel and an ASE noise component generated in the optical amplifier. Accordingly, the SNR in each channel can be obtained by calculating the ratios between peak powers S1 to S3 in each channel and noise components N1 to N3 near the respective channels. Such calculations can be performed by signal processing circuit 14 or control circuit 48 illustrated in FIG. 8, or by supervising unit 22 illustrated in FIG. 4.

Further, true signal power can be calculated by subtracting noise component power near each channel from the peak power of each signal in the corresponding channel. The operational conditions and optical output of the optical amplifier can be suitably set according to both the true signal power in each channel and the total optical power inclusive of noise power.

More specifically, the power of pumping light is controlled according to the result of measurement of the total optical power inclusive of noise power, thereby making flat the gain characteristic of the optical amplifier (the characteristic representing the relation between gain and wavelength). Further, the optical output of the optical amplifier can be controlled so as to make constant the true signal power or the average of true signal powers in channels in the case that the number of the channels has been recognized. For example, control circuit 48 illustrated in FIG. 8 can detect the SNR of second monitoring signal 43, detect true signal power according to the detected SNR, and control the optical amplifier so as to make constant the detected true signal power.

Figure 12A:
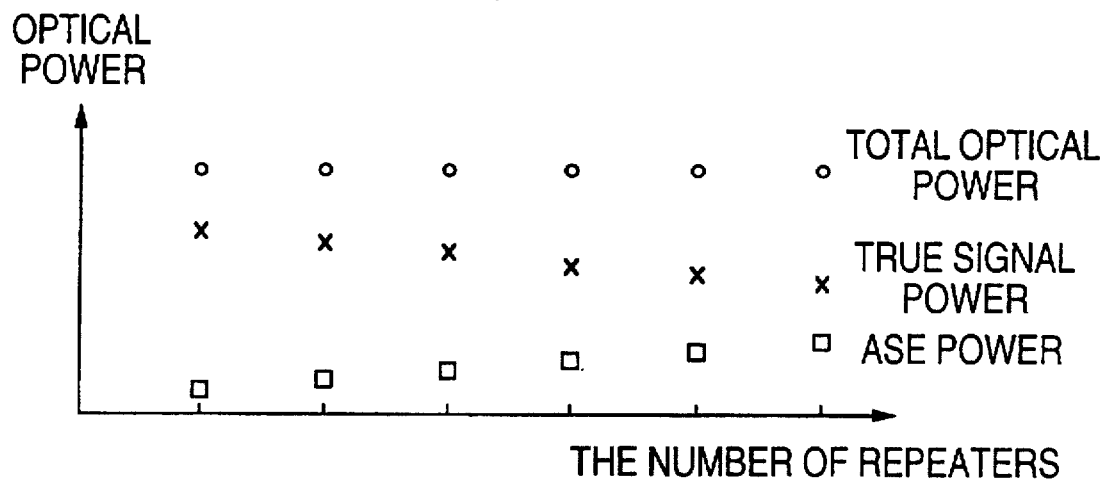
FIGS. 12A and 12B illustrate the effect of various power control methods.
Figure 12B:
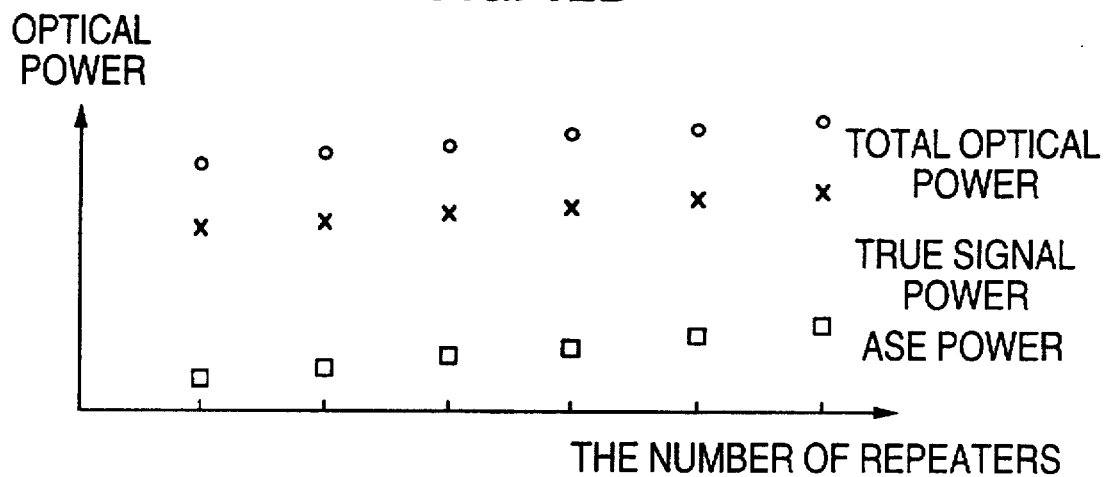

The following is a description of a difference between the case where the optical output is controlled according to only the result of measurement of the total optical power inclusive of noise power, and the case where the optical output is controlled by using the true signal power, with reference to FIGS. 12A and 12B.

More specifically, FIG. 12A is a graph illustrating the relation between total optical power, true signal power, ASE power, and the number of repeaters connected together on multiple stages, in the case where the optical output is set according to only the result of measurement of the total optical power. In contrast, FIG. 12B is a graph illustrating the relation between total optical power, true signal power, ASE power, and the number of such repeaters, in the case where the optical output is set by using the true signal power.

In the former case that the optical output is set according to only the result of measurement of the total optical power, the optical output is controlled so that the sum of the true signal power and the noise power (ASE power) becomes constant, as illustrated in FIG. 12A. Since the ASE power increases with an increase in the number of repeaters, the true signal power decreases, thereby resulting in degradation of the SNR. To the contrary, as illustrated in FIG. 12B, by detecting the true signal power and controlling the optical output so that the true signal power detected becomes constant, the degradation of the SNR can be suppressed.

It may also be possible to control the SNR by using the true signal power, wherein a tone signal having a low frequency is superimposed on a main signal in each channel.

A tone signal component can then detected, and the output power of the optical amplifier can be controlled so that the tone signal component becomes constant. However, this method requires complicated control circuitry. In addition, the main signal is degraded by the tone signal. An optical spectrum monitor as illustrated in FIG. 2 will, however, simply such control.

Therefore, as illustrated in FIGS. 8–12B, a monitoring unit includes optical spectrum monitor 34 and control circuit 48. The monitoring unit determines the spectrum of the WDM signal light and performs control processing in accordance with the determined spectrum. Control processing can include detecting a true signal, and controlling an optical amplifier to maintain the detected true signal power at a constant level. Moreover, control processing can include detecting the true signal power from a signal-to-noise ratio of the WDM signal light.

In the optical repeating system illustrated in FIG. 8, first monitoring signal 41 and second monitoring signal 43 are branched off on the upstream side and the downstream side of optical amplifier 38, respectively. Accordingly, the noise figure of optical amplifier 38 can be monitored. The noise figure is an important index representing the operational condition of optical amplifier 38. Preferably, the noise figure is always monitored during operation of optical amplifier 38. It can be determined that optical amplifier 38 is operating at a failure level when the noise figure becomes lower than a predetermined value. As a result, an alarm signal can then be provided to a supervisory device (not illustrated) for monitoring the performance of optical amplifier 28. The supervisory device can be located, for example, at a terminal station in a multi-repeating system. Further, in the case of collectively amplifying WDM signal light, it is preferable to determine a noise figure in each channel.

As expressed by the following equation, the noise figure of an optical amplifier is defined as the ratio between SNR on the input side and SNR on the output side.

(noise figure)=(SNR of input signal light)/(SNR of output signal light)

In the case of WDM signal light, the noise figure is preferably calculated for every channel. Accordingly, the noise figure of the optical amplifier can be determined in each channel by (a) first, measuring the spectrum of input signal light, (b) second, obtaining the SNR of the input signal light in each channel as described with reference to FIG. 11, (c) third, switching optical switch 44 (see FIG. 8), (d) fourth, obtaining the SNR of output signal light in each channel, and (e) fifth, calculating the ratio between the SNR of the input signal light and the SNR of the output signal light in each channel. The optical amplifier can then easily be controlled to obtain a desired noise figure.

Therefore, according to the above embodiments of the present invention, a monitoring unit can determine the spectrum of a WDM signal light and perform control processing in accordance with the determined spectrum. Control processing includes detecting a "first" signal-to-noise ratio of the WDM signal light before the WDM signal light is amplified. The monitoring unit also detects a "second" signal-to-noise ratio of the WDM signal light after the WDM signal light is amplified. The monitoring unit then determines a noise figure from the ratio of the first signal-to-noise ratio to the second signal-to-noise ratio. According to additional embodiments of the present invention, control processing can also include controlling the optical amplifier in accordance with the determined noise figure to achieve a desired noise figure.

Figure 13:
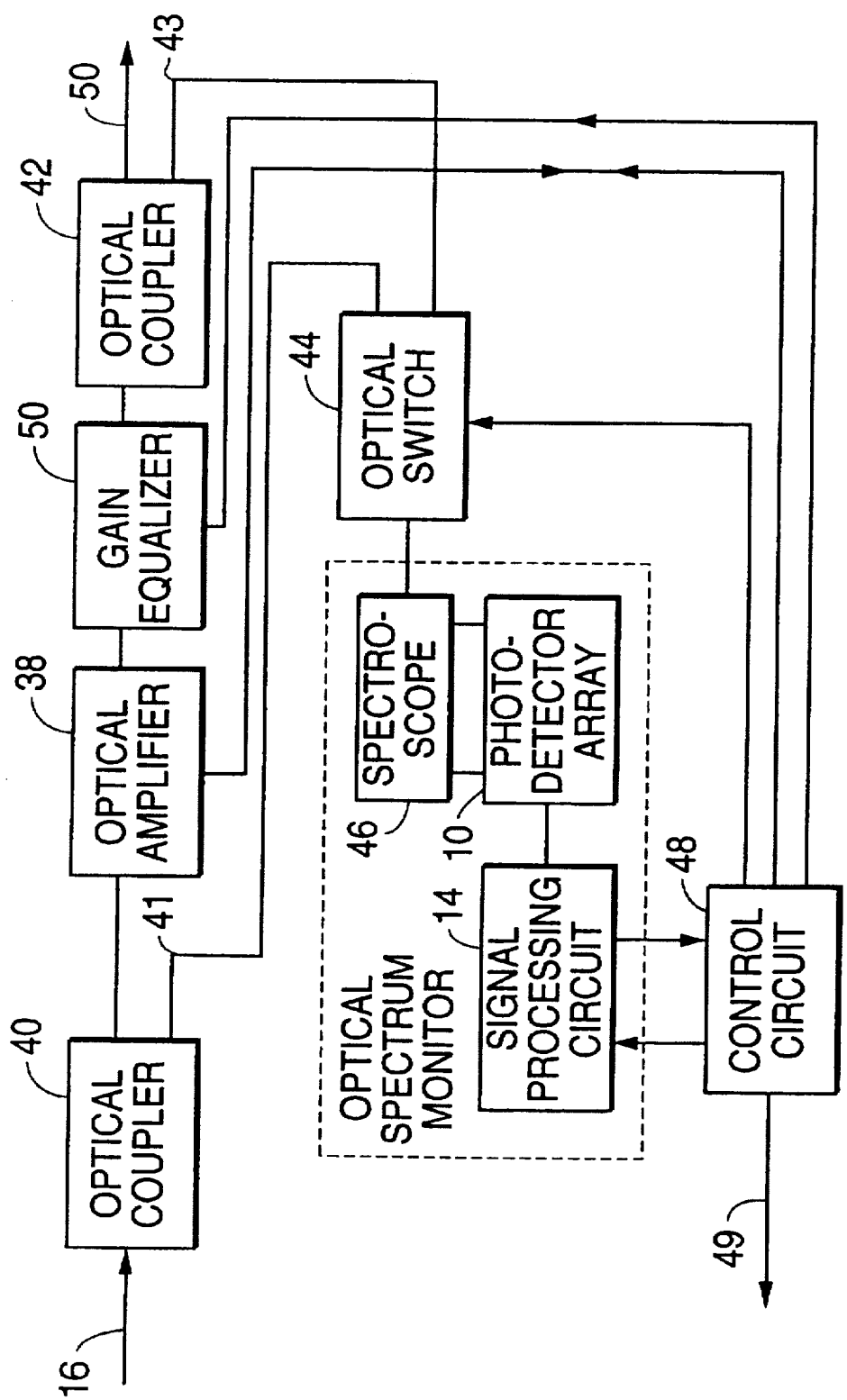
FIG. 13 is a diagram illustrating an optical repeating system according to an embodiment of the present invention.

FIG. 13 is a diagram illustrating an optical repeating system according to an embodiment of the present invention. In contrast with the embodiment of the present invention illustrated in FIG. 8, the optical repeating system illustrated in FIG. 13 equalizes the gain of optical amplifier 38 to produce a "flat" gain. More specifically, as illustrated in FIG. 13, a gain equalizer 50 is located between optical amplifier 38 and optical coupler 42. In amplifying WDM signal light over a wide band, there is a possibility that the gain to signal light in each channel may become different, thereby causing variations in optical output power. Accordingly, the spectrum of second monitoring signal 43 is measured, and the characteristics of gain equalizer 50 are controlled so that the optical output power in each channel becomes substantially constant. Accordingly, the gain characteristic of the optical amplifier 38 can be compensated by gain equalizer 50, thus making substantially constant the optical output power in each channel.

The gain compensation by gain equalizer 50 accompanies a degradation of SNR. Therefore, in the case of connecting a plurality of optical repeaters on multiple stages, it is sufficient to provide a gain equalizer for every multiple number of optical repeaters in such a manner that a desired SNR can be ensured. Further, a gain equalizer may be located independently of an optical amplifier in a transmission line or an optical node.

Therefore, as illustrated in FIG. 13, a monitoring unit includes optical spectrum monitor 34 and control circuit 48. The monitoring unit determines the spectrum of WDM signal light and performs control processing in accordance with the determined spectrum. According to the embodiment of the present invention as illustrated in FIG. 13, control processing includes equalizing the gain of an optical amplifier to maintain a flat gain.

Figure 14:
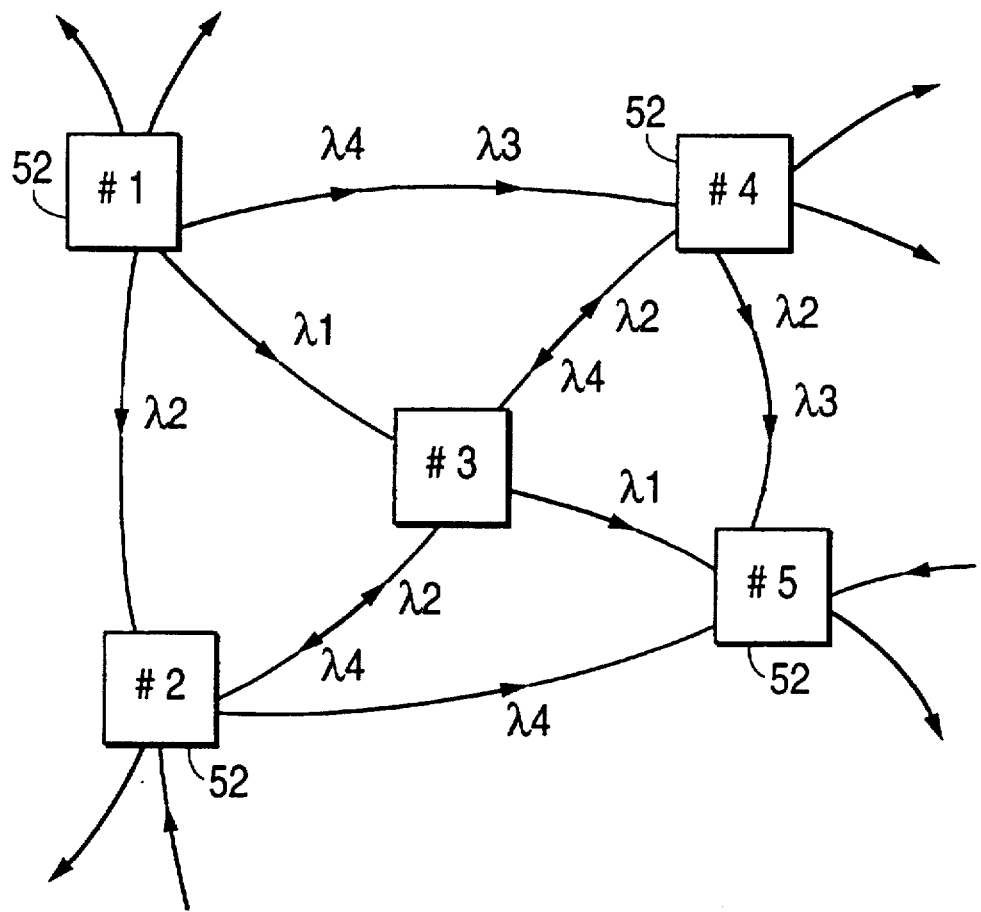
FIG. 14 is a diagram illustrating an optical wave network, according to an embodiment of the present invention.

FIG. 14 is a diagram illustrating an optical wave network, according to an embodiment of the present invention. Referring now to FIG. 14, five nodes 52 (#1 to #5) are connected together by optical paths. Signal light output from a certain terminal station (not illustrated) is transmitted through optical amplifiers (not illustrated) and the nodes 52 (#1 to #5) to another desired terminal station (not illustrated). In directing attention to a certain node, the signal light passing through this node has been transmitted through various paths, so that the SNR of the signal light varies.

It is now assumed that wavelength division multiplexing is applied to this optical wave network, and signal light (light signals) having different wavelengths is passed through the nodes along the following paths. The signal light having a wavelength $\lambda 1$ is transmitted from the node 52 (#1) through the node 52 (#3) to the node 52 (#5). The signal light having a wavelength $\lambda 2$ is transmitted from the node 52 (#1) through the nodes 52 (#2, #3, and #4) in this order to the node 52 (#5). The signal light having a wavelength $\lambda 3$ is transmitted from the node 52 (#1) through the node 52 (#4) to the node 52 (#5). The signal light having a wavelength $\lambda 4$ is transmitted from the node 52 (#1) through the nodes 52 (#4, #3, and #2) in this order to the node 52 (#5).

Figure 15:
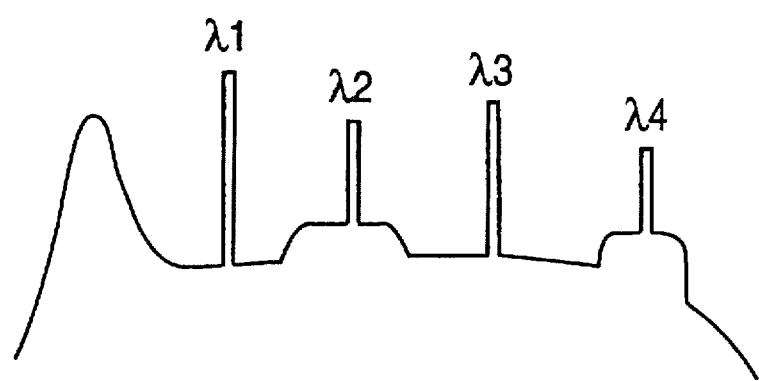
FIG. 15 is a diagram illustrating degradation of SNR, according to an embodiment of the present invention.

FIG. 15 illustrates the degradation of SNR of each light signal reaching the node 52 (#5). The light signals having the wavelengths $\lambda 1$ and $\lambda 3$ are transmitted through only one node, so that the degradation of SNR is small. To the contrary, the light signals having the wavelengths $\lambda 2$ and $\lambda 4$ are transmitted through three nodes, so that the degradation of SNR is large.

Accordingly, the SNR of each light signal degraded in SNR is monitored by using an optical spectrum analyzer, and light signals having an SNR lower than a predetermined value is selectively branched off to be regenerated, either optically or electrically, thereby improving the degraded SNR.

Figure 16:
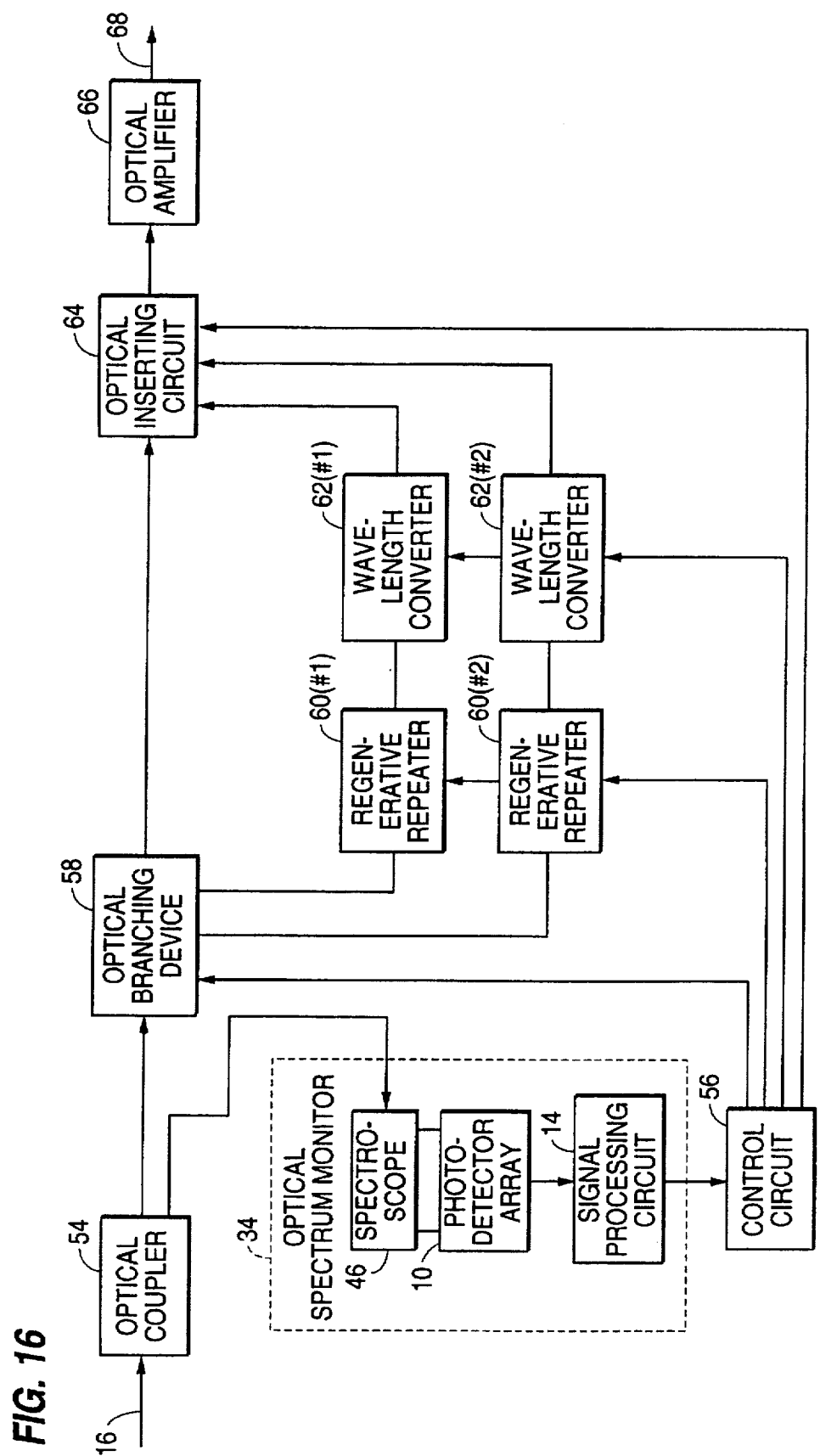
FIG. 16 is a diagram illustrating a node of an optical communication system, according to an embodiment of the present invention.

FIG. 16 is a diagram illustrating a node of an optical communication system, according to an embodiment of the present invention, incorporating such monitoring by an optical spectrum monitor. Referring now to FIG. 16, WDM signal light transmitted through a main optical path 16 is branched into two components by an optical coupler 54. One of the two components is supplied as a monitoring signal to an optical spectrum monitor 34. An output signal from the optical spectrum monitor 34, indicating the spectrum of the WDM signal light, is supplied to a control circuit 56. The other component branched off by optical coupler 54 is supplied to an optical branching device 58. The spectrum of the WDM signal light is then analyzed by signal processing circuit 14. Control circuit 56 then controls optical branching device 58 to extract light signals in channels required to be improved in SNR, and supplies them to regenerative repeaters 60 (#1 and #2).

As illustrated in FIG. 16, for example, two regenerative repeaters 60 (#1 and #2) are used. Accordingly, light signals in two channels can be improved in SNR. However, addition regenerative repeaters can be used. Regenerative repeaters 60 (#1 and #2) receive extracted light signals and regenerate the extracted light signals. Regenerated light signals are then converted in wavelength by wavelength converters 62 (#1 and #2) as required. Thus, wavelength converters 62 (#1 and #2) reconstruct the wavelength of regenerated light signals. The wavelength reconstructed light signals are then joined to the WDM signal light in the main optical path by an optical inserting device 64. Output light from optical inserting device 64 is transmitted through an optical amplifier 66, and output as WDM signal light 68.

Regenerative repeaters and wavelength converters are known devices. Generally, a regenerative repeaters converts an optical signal to electrical signals, reconstructs the signal electrically, and converts the signal back to an electrical signal. Typically, a regenerative repeater regenerates the shape of an optical signal. More specifically, a light source (such as a laser diode) in a regenerative repeater is usually not tunable to the different wavelengths of the different channels. Therefore, a wavelength converter can be used to "reconstruct" the wavelength of the optical signal. However, a regenerative repeater may be designed with a tunable laser so that a wavelength converter may not be necessary. Therefore, the present invention is not intended to be limited to the use of both a wavelength converter and a regenerative repeater. Moreover, the present invention is not intended to be limited to regenerative repeaters and wavelength converters which regenerate or construct by converting optical signals to electrical signals, or convert electrical signals to optical signals. Instead, regenerative repeaters and wavelength converters may be used which maintain a signal as an optical signal without converting to electrical signals.

Control circuit 56 controls optical branching device 58, regenerative repeaters 60 (#1 and #2), wavelength converters 62 (#1 and #2), and optical inserting device 64, according to the spectrum detected by optical spectrum monitor 34.

The number of channels of light signals passing through a node and which must be regeneratively repeated can be determined in accordance with a specific probability. The probability is determined in accordance with the magnitude of the optical wave network. Accordingly, it is not necessary to use a number of regenerative repeaters corresponding to the maximum number of channels that can be handled at one node. Instead, it is sufficient to use a proper number of regenerative repeaters considering the probability that a channel will require such processing. That is, it is sufficient to regenerate only light signals each having an SNR lower than a predetermined value. Therefore, in the embodiment of the present invention illustrated in FIG. 16, a WDM signal may have more than two channels, but the use of only two regenerative repeaters will appropriately handle the number of channels which must be regenerated.

In an optical wave network, the wavelength of each light signal may correspond to an address indicating a final destination (e.g., a desired terminal station) or indicating the next node which must be reached. In this case, each wavelength in the node, the SNR on the input side of the node, and the SNR on the output side of the node can be determined. Also, noise added by an optical amplifier incorporated in the node can be considered. As a result, the receiving quality of each light signal upon reaching the destination can be calculated. According to such calculation, the number of channels required to be regeneratively repeated in the node, and the order of precedence of regenerative repeating, can be determined.

Therefore, as illustrated in FIG. 16, a monitoring unit includes optical spectrum monitor 34 and control circuit 56. The monitoring unit detects the spectrum of WDM signal light and performs control processing in accordance with the determined spectrum. According to the embodiment of the present invention illustrated in FIG. 16, control processing includes selecting a respective channel of WDM signal light for signal enhancement in accordance with the detected signal. Signal enhancement includes, for example, amplification, reconstruction and/or regeneration of a signal.

According to the above embodiments of the present invention, an optical communication system ensures long-term stability, improvement in reliability, and high-speed response in performing monitor/control of WDM signal light.

According to the above embodiments of the present invention, an optical communication system includes an optical processing unit for performing at least one transmitting, receiving, repeating, branching, and switching on signal light to be transmitted by a main optical path. A monitor unit detects a spectrum of the signal light depending on the processes performed by the optical processing unit. The monitor unit (a) extracts a monitoring signal as a part of the signal light from the main optical path; and (b) disperses light in the monitoring signal in a band containing a wavelength of at least the signal light. The monitor unit includes a photodetector array having a plurality of opto-electric conversion elements positioned to receive the dispersed light of the monitoring signal. The monitor unit then calculates the spectrum of the signal light according to an output signal from the photodetector array.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical communication system transmitting wavelength division multiplexed (WDM) signal light through an optical fiber, comprising:

a decoupling unit decoupling a portion of the WDM signal light from the optical fiber as a monitoring signal; and a monitoring unit, connected to the decoupling unit, determining the spectrum of the WDM signal light from the monitoring signal and performing control processing in accordance with the determined spectrum.

2. An optical communication system as in claim 1, the WDM signal light including a plurality of channels and the optical communication system further comprising:

a plurality of light sources corresponding, respectively, to the plurality of channels, each light source providing a light signal at a respective wavelength on the corresponding channel, the light signals being combined to form the WDM signal light, wherein the control processing performed by the monitoring unit includes detecting the respective wavelength of each light signal from the determined spectrum, and controlling the light sources to maintain the detected wavelength of each light signal to be constant.

3. An optical communication system as in claim 2, wherein the light sources are laser diodes, and the monitoring unit controls the light sources by controlling the temperature of the light sources.

4. An optical communication system as in claim 2, wherein the monitoring signal includes different wavelength components of the WDM signal light, and the monitoring unit comprises:

a dispersion unit receiving the monitoring signal from the decoupling unit and simultaneously dispersing different wavelength components of the WDM signal in different directions, and opto-electric conversion elements at fixed positions for receiving the wavelength components dispersed from the dispersion unit without rotating or moving the dispersion unit, the monitoring unit determining the spectrum of the WDM signal light from wavelength components received by the opto-electric conversion elements.

5. An optical communication system as in claim 1, further comprising:

an optical amplifier receiving the WDM signal light and amplifying the received WDM signal light, wherein the decoupling unit comprises a first decoupler decoupling a portion of the WDM signal light before the WDM signal light is received by the optical amplifier, a second decoupler decoupling a portion of the WDM signal light after the WDM signal light is amplified by the optical amplifier, and a switch receiving the portion decoupled by the first decoupler and the portion decoupled by the second decoupler and being controllable to select one of the received portions as the monitoring signal.

6. An optical communication system as in claim 5, wherein the control processing performed by the monitoring unit includes controlling the switch of the decoupling unit to select the portion decoupled by the first decoupler and then detecting a signal-to-noise ratio of the WDM signal light from the decoupled portion, the detected signal-to-noise ratio defined as a first signal-to-noise ratio, controlling the switch of the decoupling unit to select the portion decoupled by the second decoupler and then detecting a signal-to-noise ratio of the amplified WDM signal light from the decoupled portion, the detected signal-to-noise ratio defined as a second signal-to-noise ratio, and determining a noise figure from the ratio of the first signalto-noise ratio to the second signal-to-noise ratio.

7. An optical communication system as in claim 6, wherein the control processing performed by the monitoring unit includes controlling the optical amplifier in accordance with the determined noise figure to achieve a desired noise figure.

8. An optical communication system as in claim 6, wherein the monitoring signal includes different wavelength components of the WDM signal light, and the monitoring unit comprises:

a dispersion unit receiving the monitoring signal from the decoupling unit and simultaneously dispersing different wavelength components of the WDM signal in different directions, and opto-electric conversion elements at fixed positions for receiving the wavelength components dispersed from the dispersion unit without rotating or moving the dispersion unit, the monitoring unit determining the spectrum of the WDM signal light from wavelength components received by the opto-electric conversion elements.

9. An optical communication system as in claim 1, further comprising:

an optical amplifier receiving the WDM signal light and amplifying the received WDM signal light, wherein the decoupling unit decouples, as the monitoring signal, a portion of the WDM signal light after the WDM signal light is amplified by the optical amplifier, and the control processing performed by the monitoring unit includes equalizing the gain of the optical amplifier in accordance with the determined spectrum to maintain a flat gain.

10. An optical communication system as in claim 9, wherein the monitoring signal includes different wavelength components of the WDM signal light, and the monitoring unit comprises:

a dispersion unit receiving the monitoring signal from the decoupling unit and simultaneously dispersing different wavelength components of the WDM signal in different directions, and opto-electric conversion elements at fixed positions for receiving the wavelength components dispersed from the dispersion unit without rotating or moving the dispersion unit, the monitoring unit determining the spectrum of the WDM signal light from wavelength components received by the opto-electric conversion elements.

11. An optical communication system as in claim 1, further comprising:

an optical amplifier receiving the WDM signal light and amplifying the received WDM signal light, wherein the decoupling unit decouples, as the monitoring signal, the portion of the WDM signal light from one of the WDM signal light before the WDM signal light is received by the optical amplifier, and the WDM signal light after the WDM signal light is amplified by the optical amplifier, and the control processing performed by the monitoring unit includes detecting a true signal power of the WDM signal light from the monitoring signal, and controlling the optical amplifier to maintain the detected true signal power at a constant level.

12. An optical communication system as in claim 11, wherein the monitoring unit detects the true signal power by detecting a signal-to-noise ratio of the WDM signal light from the monitoring signal, and detecting the true signal power from the detected signal-to-noise ratio.

13. An optical communication system as in claim 1, wherein the WDM signal light includes a plurality of channels, and the control processing performed by the monitoring unit includes determining the number of channels of the WDM signal light from the determined spectrum.

14. An optical communication system as in claim 13, wherein the determined spectrum indicates the power level of the WDM signal light in a plurality of bands, and the monitoring unit determines the number of channels by counting a number of bands in which the power level of the WDM signal light is greater than a threshold level.

15. An optical communication system as in claim 14, further comprising:
an optical amplifier receiving the WDM signal light and amplifying the received WDM signal light, wherein the decoupling unit decouples the portion of the WDM signal light from one of
the WDM signal light before the WDM signal light is received by the optical amplifier, and
the WDM signal light after the WDM signal light is amplified by the optical amplifier.

16. An optical communication system as in claim 13, wherein the determined spectrum indicates the power level of the WDM signal light in a plurality of bands, and the monitoring unit determines the number of channels by forming a differential signal of the determined spectrum and corresponding to changes in the power level of the WDM signal light in the plurality of bands, and counting the number of bands in which the differential signal is greater than a threshold level.

17. An optical communication system as in claim 16, further comprising:
an optical amplifier receiving the WDM signal light and amplifying the received WDM signal light, wherein the decoupling unit decouples the portion of the WDM signal light from one of
the WDM signal light before the signal light is received by the optical amplifier, and
the WDM signal light after the WDM signal light is amplified by the optical amplifier.

18. An optical communication system as in claim 1, the WDM signal light including a plurality of channels and the optical communication system further comprising:
first and second light sources provided for each channel and being individually selectable to provide a light signal on the channel, wherein the control processing performed by the monitoring unit includes selecting one of the first and second light sources to provide a light signal in accordance with the determined spectrum.

19. An optical communication system as in claim 1, wherein the monitoring signal includes different wavelength components of the WDM signal light, and the monitoring unit comprises:
a dispersion unit receiving the monitoring signal from the decoupling unit and simultaneously dispersing different wavelength components of the WDM signal in different directions, and
opto-electric conversion elements at fixed positions for receiving the wavelength components dispersed from the dispersion unit without rotating or moving the dispersion unit, the monitoring unit determining the spectrum of the WDM signal light from wavelength components received by the opto-electric conversion elements.

20. An optical communication system as in claim 1, wherein the WDM signal light includes a plurality of channels and the control processing performed by the monitoring unit includes selecting a respective channel from the plurality of channels for signal enhancement in accordance with the detected spectrum.

21. An optical communication system as in claim 20, further comprising:
a regenerative repeater regenerating the selected channel, to thereby provide signal enhancement of the selected channel.

22. An optical communication system as in claim 20, further comprising:
a branching device branching the selected channel off the WDM signal light;
a regenerative repeater receiving the selected channel from the branching device and regenerating the selected channel; and
an insertion unit inserting the regenerated, selected signal back into the WDM signal light, thereby providing signal enhancement of the selected channel.

23. An optical communication system as in claim 20, further comprising:
a branching device branching the selected channel off the WDM signal light;
a regenerative repeater receiving the selected channel from the branching device and regenerating the selected channel;
a wavelength converter receiving the regenerated, selected channel, and reconstructing a wavelength of the regenerated, selected channel; and
an insertion unit receiving the wavelength reconstructed, regenerated, selected channel and inserting the wavelength reconstructed, regenerated, selected channel back into the WDM signal light, thereby providing signal enhancement of the selected channel.

24. An optical communication system as in claim 20, wherein the monitoring signal includes different wavelength components of the WDM signal light, and the monitoring unit comprises:
a dispersion unit receiving the monitoring signal from the decoupling unit and simultaneously dispersing different wavelength components of the WDM signal in different directions, and
opto-electric conversion elements at fixed positions for receiving the wavelength components dispersed from the dispersion unit without rotating or moving the dispersion unit, the monitoring unit determining the spectrum of the WDM signal light from wavelength components received by the opto-electric conversion elements.

25. An optical communication system transmitting wavelength division multiplexed (WDM) signal light through an optical fiber, comprising:
a decoupling unit decoupling a portion of the WDM signal light from the optical fiber as a monitoring signal; and
a monitoring unit, connected to the decoupling unit, and comprising
a dispersion unit receiving the monitoring signal and simultaneously dispersing different wavelength components of the WDM signal in different directions, and
receivers at fixed positions for receiving the wavelength components dispersed from the dispersion unit without rotating or moving the dispersion unit, wherein the monitoring unit determines the spectrum of the WDM signal light from wavelength components received by the receivers and performs control processing in accordance with the determined spectrum.

26. An method of transmitting a wavelength division multiplexed (WDM) signal light through an optical fiber, comprising the steps of:

decoupling a portion of the WDM signal light from the optical fiber as a monitoring signal;

determining the spectrum of the WDM signal light from the monitoring signal; and performing control processing in accordance with the determined spectrum.

* * * * *